UNITED STATES PATENT OFFICE.

MAX HESSENLAND, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFF.

999,785. Specification of Letters Patent. Patented Aug. 8, 1911.

No Drawing. Application filed September 26, 1910. Serial No. 583,916.

*To all whom it may concern:*

Be it known that I, MAX HESSENLAND, Ph. D., chemist, a citizen of the Empire of Germany, residing at Höchst-on-the-Main, Germany, have invented certain new and useful Improvements in Vat Dyestuffs, of which the following is a specification.

I have found that dianthraquinonylamins which contains the thioxanthone group are vat-dyestuffs of great value. They are derived from the anthraquinonethioxanthone of the constitution:

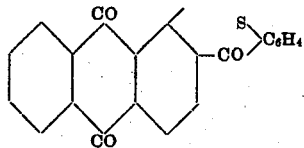

and can be obtained by treating the amino- or the halogen-anthraquinone-thioxanthones with halogen-, respectively amino-, derivatives of the anthraquinone.

The new dyestuffs are red to grayish-blue powders, difficultly soluble in the usual solvents, soluble in concentrated sulfuric acid. When treated with an alkaline hydrosulfite solution, they yield vats which dye cotton red to grayish-blue tints of excellent fastness.

The following example illustrates the process: By the combination of 1.5 chloroaminoanthraquinone with thiosalicylic acid and subsequently treating the aminoanthraquinonyl-thiosalicylic acid with chlorosulfonic acid, the 1-amino-5.6-anthraquinone-thioxanthone is obtained. Seven parts by weight of this compound and six parts of α-chloroanthraquinone are boiled for 4–5 hours in a reflux-apparatus, while stirring, with three parts of anhydrous sodium acetate, one part of cuprous chlorid and 150 parts of nitrobenzene. The separated condensation-product may be heated with diluted nitric acid for removing copper; it forms a red powder difficultly soluble in the usual solvents and dissolving to a reddish-brown solution in concentrated sulfuric acid, and to a violet solution in concentrated sulfuric acid mixed with formaldehyde. When treated with alkaline hydrosulfite, it gives a brownish-violet vat which dyes cotton claret-red tints of excellent fastness. Similar dyestuffs are obtained, for instance, by treating in an analogous manner 1-amino-5.6-anthraquinone thioxanthone with 1.5-dichloranthraquinone or with 1-chloro-5.6 anthraquinine-thioxanthone, or by treating 1-chloro-5.6-anthraquinone-thioxanthone with α- or β-aminoanthraquinone.

Having now described my invention, what I claim is:

1. As new products, anthraquinone-thioxanthones which are also dianthraquinonylamins, being red to grayish-blue powders, difficultly soluble in the usual solvents, soluble in concentrated sulfuric acid, yielding, when treated with an alkaline hydrosulfite solution, vats which dye cotton red to grayish-blue tints of excellent fastness.

2. As a new product, the 1-anthraquinonylamin-5.6-anthraquinone-thioxanthone, obtainable by combining 1-amino-5.6-thioxanthone with α-chloroanthraquinone, being a red powder, difficultly soluble in the usual solvents, soluble in concentrated sulfuric acid, and yielding, when treated with an alkaline hydrosulfite solution, a brownish-violet vat which dyes cotton claret-red tints of excellent fastness.

In testimony whereof, I affix my signature in presence of two witnesses.

MAX HESSENLAND.

Witnesses:
JEAN GRUND,
CARL GRUND.

Copies of this patent may be obtained for five cents each, by addressing the "Commissioner of Patents, Washington, D. C."